No. 675,392. Patented June 4, 1901.
R. M. KEATING.
PEDAL BRAKE AND CONTROLLER FOR MOTOR CYCLES.
(Application filed Dec. 8, 1900.)
(No Model.) 2 Sheets—Sheet 1.
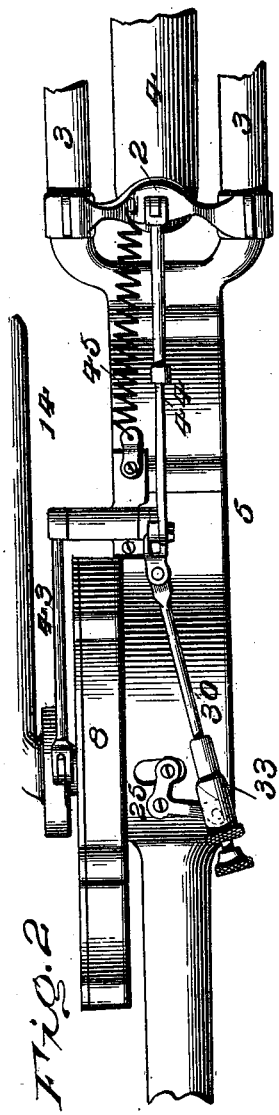
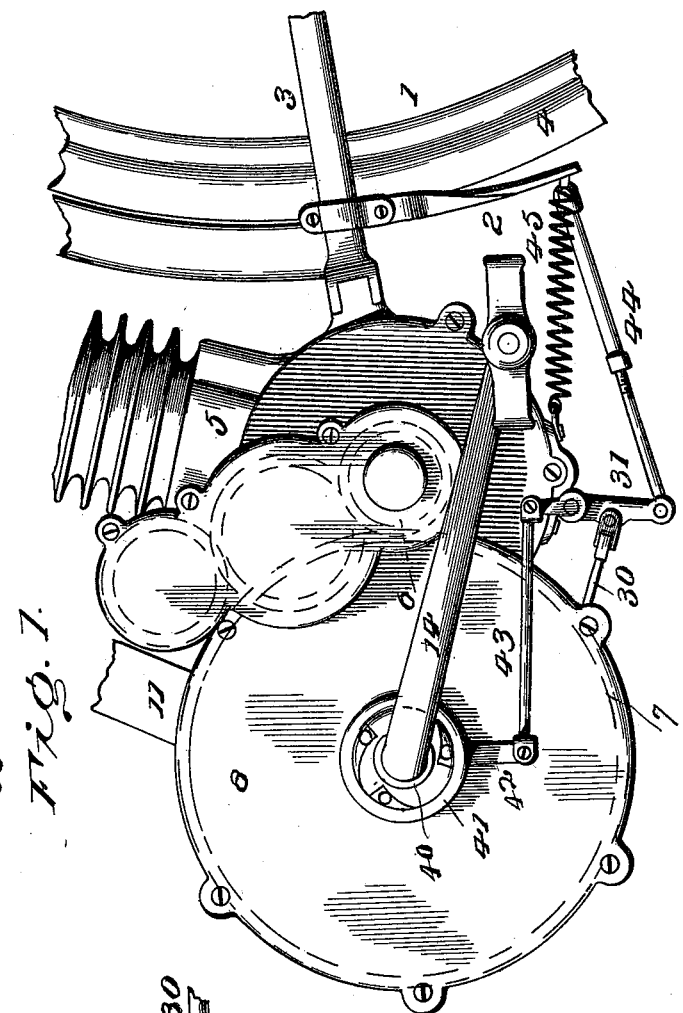
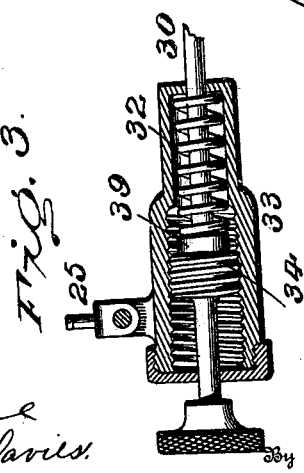

No. 675,392. Patented June 4, 1901.
R. M. KEATING.
PEDAL BRAKE AND CONTROLLER FOR MOTOR CYCLES.
(Application filed Dec. 8, 1900.)
(No Model.) 2 Sheets—Sheet 2.
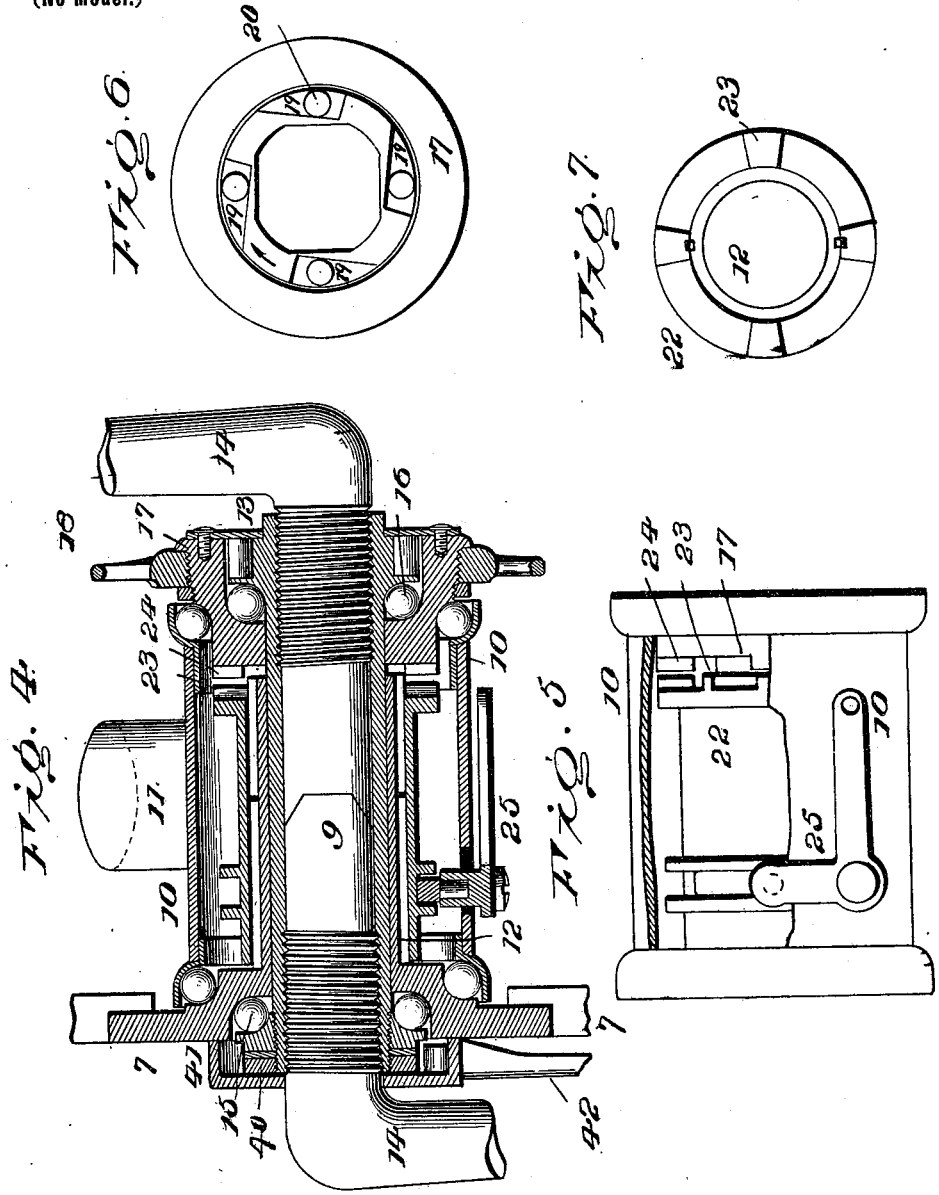
WITNESSES
INVENTOR
R. M. Keating
BY
W. H. Bartlett
ATTORNEY.

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

PEDAL-BRAKE AND CONTROLLER FOR MOTOR-CYCLES.

SPECIFICATION forming part of Letters Patent No. 675,392, dated June 4, 1901.

Application filed December 8, 1900. Serial No. 39,178. (No model.)

*To all whom it may concern:*

Be it known that I, ROBERT M. KEATING, residing at Middletown, in the State of Connecticut, have invented certain new and useful Improvements in Pedal-Brakes and Controllers for Motor-Bicycles, of which the following is a specification, reference being had therein to the accompanying drawings.

This invention relates to bicycles of the character which may be driven by pedals or a motor, or both.

The object of the invention is to place the control of the machine largely with the pedals, so that the pedals may be used to reinforce the engine when desirable or may be used by back-pedaling to throw the engine out of its driving relation and apply the brake, if desirable, leaving the engine to run free, and mechanism is provided by which the engine may be thrown entirely out of driving relation with the bicycle, so that the pedals may be used as usual.

Figure 1 is a broken side elevation of so much of the driving-gear of a bicycle as is needful to illustrate the invention. Fig. 2 is a bottom plan of the pedal-hanger and connections. Fig. 3 is a longitudinal section of the clutch coupling-link and device for changing the length thereof. Fig. 4 is a longitudinal section of the crank-hanger and bearings and couplings therefor. Fig. 5 is a broken plan of the hanger and a partial elevation of a clutch and coupling device. Fig. 6 is an end view of the roller-clutch. Fig. 7 is a face view of one of the face-gear clutch members.

The numeral 1 indicates enough of the rear or driving wheel of a bicycle to show the relation of the brake 2 thereto. The brake 2 is supported on bar 3 of the frame and is applied by pressure against the tire 4.

An engine 5, of any desirable pattern, drives the gear 6, which gear engages the driving-gear 7, the latter being inclosed in casing 8, and the pedal-shaft 9 passing centrally through this driving-wheel and through bracket or hanger 10, connected to the seat-post 11 or other part of the frame.

The driving-gear 7 is fixed to sleeve 12, which sleeve surrounds the sleeve 13, to which sleeve 13 the pedal-cranks 14 are connected in usual manner. Sleeve 13 has bearing-balls 15 interposed between itself and the driving-wheel 7 and bearing-balls 16 interposed between itself and clutch-ring 17, the ball-bearings being held in place in usual manner.

Clutch-ring 17 is rigidly secured to the driving-sprocket 18, from which the driven wheel or rear wheel of the bicycle is driven, as by a sprocket-chain. Ring 17 surrounds sleeve 13, which ring has inclined surfaces 19, and rollers 20, interposed between these inclined faces and the ring 17, act to clutch the ring and sleeve together when either ring or sleeve is driven in such direction as to force the rolls 20 to the narrow part of the inclines 19 in manner well known. Thus when the sleeve 13, connected to the pedal-cranks, is driven by the cranks in the direction of the arrow, Fig. 6, the ring 17 and sprocket-wheel 18 will be driven, and thus the bicycle will be propelled; but if ring 17 be otherwise driven faster than the pedals the pedals may stand still and the sprocket 18 will move with the ring 17 and propel the bicycle.

If the machine is driven from the wheel 7, the pedal-clutch must be driven faster than the engine to be able to overtake and relieve the engine.

The sleeve 12 bears an outer sleeve 22, splined thereto and movable lengthwise on sleeve 12, but incapable of independent rotation. Sleeve 22 has a face-clutch 23, which is in position to engage clutch member 24 of ring 17 when the sleeve 22 is shifted lengthwise on sleeve 12. Sleeve 22 is shifted into clutch engagement with ring 17 by crank-lever 25, pivoted to the hanger 10 and engaging a groove in the face of sleeve 22 or a space between collars thereon, as shown in Figs. 4 and 5.

The crank-lever 25 is normally held in position to engage the face-clutches 23 and 24 by a rod or link 30, connected to the brake-lever 31. This rod 30 is connected to lever 25 by an extension-coupling. Rod 30 has a head 39, and a spring 32 pushes said head along in box 33. Box 33 is pivotally connected to lever 25. (See Fig. 3.) A nut 34, engaging a screw-thread on the inside of box 33, may be turned so as to push the rod 30 along in the box against the resistance of spring 32. Thus the shortening or lengthening of rod 30 and the box 33, forming the extension thereof, determines the position of lever 25, and thereby the clutch-sleeve 22.

The pedal-crank shaft has a clutch member 40 connected thereto, the same having inclines similar to the inclines 19 heretofore described, but faced in opposite direction. A ring-collar 41 surrounds this clutch member 40, and bearing-rolls are interposed in the same manner as shown in Fig. 6 and as shown on a small scale in Fig. 1. The collar 41 has a rigid lever 42, connected by link 43 with the brake-lever 31. Back-pedaling on the cranks 14 thus causes the clutch engagement with the collar 41 and operates lever 31 to apply the brake, and at the same time lever 31 by means of the connections 30 and 25 moves sleeve 22 to uncouple the driving-wheel 7 from the driving-ring 17, which carries sprocket 18. The adjustment of extension box or piece 33 may be such that the back-pedal motion may uncouple the engine from the driving-gear before the brake is applied, and the application of the brake then becomes optional. The relation of the lever 25 to rod 30 may be made such as to retain the clutch member 22 permanently out of engagement with clutch-ring 17, but still leaving the brake under control of the pedals. Then the bicycle can be driven, as usual, by the pedals and the brake applied by back-pedaling.

The connection from lever 31 to the brake 2, as shown, is by means of extension-rod 44, and the brake is held out of engagement by spring 45; but the connections might be otherwise made, these being shown merely as examples of an operative construction.

What I claim is—

1. In combination with a motor-driven wheel of a bicycle, a pedal-shaft and a clutch by which the pedals may be brought into driving relation as a reinforcement to the motor, and a clutch operated by the back-pedal movement by which the engine is thrown out of driving engagement, substantially as described.

2. In combination with a motor-driven wheel of a bicycle, a pedal-shaft, a brake operated by back-pedaling on the pedal-shaft, and a clutch operated by the back-pedaling of said shaft to uncouple the motor from driving relation with the vehicle.

3. The combination with the sprocket or similar drive-wheel of a bicycle, of a motor driving-wheel having clutch engagement with said sprocket, a pedal-clutch engaging the sprocket by forward movement, a brake operated by back-pedal movement of the pedals, and means by which the clutch engagement of the motor is disconnected by the back-pedaling of the pedals, substantially as described.

4. The combination with the crank-hanger of a bicycle, of a motor-driven wheel centered thereon, a pedal-shaft passing through said motor-driven wheel and the crank-hanger, a clutch-ring carried on the crank-shaft and having clutch engagement therewith when the crank is driven forward at a greater speed than the said motor-driven wheel, clutch mechanism by which the clutch-ring and motor-driven wheel may be brought into engagement, and a back-pedaling connection from the pedal-shaft, by which the motor-driven wheel may be disengaged from the clutch-ring.

5. In combination with the pedal-crank of a bicycle, a brake mechanism applied by the back-pedaling movement, a motor-driven wheel having clutch engagement with the driving-sprocket of the vehicle, and adjustable mechanism connecting the brake mechanism to said clutch, so as to uncouple the driving-clutch with predetermined relation to the brake movement.

6. The combination of a pedal-shaft, a clutch mechanism applied thereto and operating by back-pedaling to move the brake-lever, a motor-driven wheel connected by clutch to the driving-sprocket, and a connection from the brake-lever by which said clutch is uncoupled when the brake is applied.

7. The combination of a power-driven wheel, a longitudinally-movable clutch-sleeve connected thereto, a clutch-ring carrying the driving-sprocket with which said sleeve may be engaged, a pedal-shaft passing through said sleeve and ring, a brake-lever and clutch mechanism on the pedal-shaft by which the same may be brought into operation by back-pedaling, a lever operating on the motor-driven sleeve to shift the same, and extensible connections from the brake-lever to said sleeve-shifting lever, substantially as described.

8. The combination with the pedal-shaft, a clutch thereon operated by back-pedaling to move the operating-lever, a power-driven wheel on the shaft and clutch connections to the driving-sprocket, the operating-lever connected to the back-pedal clutch to operate as described, a link connecting from said operating-lever having an extensible box, and a lever connected to said box and to a member of the motor driving-clutch, whereby the driving-clutch may be uncoupled at the initial movement of back-pedaling, substantially as described.

In testimony whereof I affix my signature in presence of two witnesses.

ROBERT M. KEATING.

Witnesses:
W. A. BARTLETT,
HARVEY T. WINFIELD.